United States Patent
Shirguppe et al.

(10) Patent No.: US 12,524,906 B2
(45) Date of Patent: Jan. 13, 2026

(54) METHOD AND APPARATUS FOR OPTIMUM OVERLAP RATIO ESTIMATION FOR THREE DIMENSIONAL (3D) RECONSTRUCTIONS

(71) Applicant: QUALCOMM Incorporated, San Diego, CA (US)

(72) Inventors: Siddhant Sanjay Shirguppe, Belgaum (IN); Ajay Surendranath, Bengaluru (IN); Srikanth Thatipamula, Telangana (IN); Manoj Surya K, Bengaluru (IN)

(73) Assignee: QUALCOMM INCORPORATED, San Diego, CA (US)

( * ) Notice: Subject to any disclaimer, the term of this patent is extended or adjusted under 35 U.S.C. 154(b) by 455 days.

(21) Appl. No.: 18/163,637

(22) Filed: Feb. 2, 2023

(65) Prior Publication Data

US 2024/0265570 A1 Aug. 8, 2024

(51) Int. Cl.
*G06T 7/73* (2017.01)
(52) U.S. Cl.
CPC ...... *G06T 7/74* (2017.01); *G06T 2207/10028* (2013.01)
(58) Field of Classification Search
CPC ... G06T 7/55; G06T 7/74; G06T 2207/10028; G06T 2207/10016
See application file for complete search history.

(56) References Cited

U.S. PATENT DOCUMENTS

| | | | | |
|---|---|---|---|---|
| 8,711,143 B2* | 4/2014 | Jin | .......................... | G06T 7/564 |
| | | | | 345/420 |
| 9,020,187 B2* | 4/2015 | Pirchheim | ............... | G06T 7/246 |
| | | | | 382/103 |
| 9,202,125 B2* | 12/2015 | Kawano | .................. | G06V 40/10 |
| 9,432,636 B2* | 8/2016 | Gourlay | .................... | G06T 7/33 |

(Continued)

FOREIGN PATENT DOCUMENTS

EP 3131060 A1 2/2017

OTHER PUBLICATIONS

Cho M., et al., "3D Image Reconstruction with a Controllable Overlapping Number of Elemental Images in Computational Integral Imaging", Chinese Optics Letters, vol. 13, No. 5, 2015, pp. 051101.

(Continued)

*Primary Examiner* — Gregory M Desire
(74) *Attorney, Agent, or Firm* — Polsinelli LLP/QUALCOMM 1INCORPORATED

(57) ABSTRACT

Techniques and systems are provided for image processing. For instance, a process can include obtaining pose information for an image sensor, the pose information indicating a set of viewpoints of an environment, wherein the image sensor is configured to capture frames for reconstructing an object; fitting a curve to the set of viewpoints; determining one or more characteristics of a curve; determining a direction of the image sensor based on the one or more characteristics of the curve and the set of viewpoints; determining an overlap ratio based on the one or more characteristics of (Continued)

the curve and the determined direction of the image sensor; and outputting the determined overlap ratio for selecting frames to be used for reconstructing the object.

27 Claims, 12 Drawing Sheets

(56) References Cited

U.S. PATENT DOCUMENTS

| | | | |
|---|---|---|---|
| 9,443,349 B2* | 9/2016 | Wang | G06T 19/20 |
| 10,950,034 B1* | 3/2021 | Garcia | G06T 15/20 |
| 11,218,683 B2* | 1/2022 | Pesonen | H04N 13/161 |
| 12,062,145 B2* | 8/2024 | Xiong | G06T 7/11 |
| 2011/0007072 A1* | 1/2011 | Khan | G06T 7/564 |
| | | | 345/420 |

OTHER PUBLICATIONS

International Search Report and Written Opinion—PCT/US2023/083901—ISA/EPO—Mar. 14, 2024.

Kim S.H., et al., "Key Frame Selection Algorithms for Automatic Generation of Panoramic Images from Crowdsourced Geo-tagged Videos", May 29, 2014, SAT 2015 18th International Conference, Austin, TX, USA, Sep. 24-27, 2015, [Lecture Notes in Computer Science, Lect.Notes Computer], Springer, Berlin, Heidelberg, pp. 67-84, XP047295295, abstract p. 68, paragraph 4.

Koschel A., et al., "Selection of Key Frames for 3D Reconstruction in Real Time", Algorithms, vol. 14, No. 303, 2021, pp. 1-16.

* cited by examiner

METHOD AND APPARATUS FOR OPTIMUM OVERLAP RATIO ESTIMATION FOR THREE DIMENSIONAL (3D) RECONSTRUCTIONS

FIELD

The present disclosure generally relates to image processing. For example, aspects of the present disclosure relate to systems and techniques for performing optimum overlap ratio estimation for three dimensional (3D) reconstructions.

BACKGROUND

Many devices and systems allow a scene to be captured by generating frames (also referred to as images) and/or video data (including multiple frames) of the scene. For example, a camera or a computing device including a camera (e.g., a mobile device such as a mobile telephone or smartphone including one or more cameras) can capture a sequence of frames of a scene. The image and/or video data can be captured and processed by such devices and systems (e.g., mobile devices, IP cameras, etc.) and can be output for consumption (e.g., displayed on the device and/or other device). In some cases, the image and/or video data can be captured by such devices and systems and output for processing and/or consumption by other devices.

A frame or image can be processed (e.g., using object detection, recognition, segmentation, etc.) to determine any objects that are present in the frame, which can be useful for many applications. For instance, a model can be determined for representing an object in a frame, and can be used to facilitate effective operation of various systems. Examples of such applications and systems include extended reality (XR), robotics, automotive and aviation, three-dimensional scene understanding, object grasping, object tracking, in addition to many other applications and systems. The term XR can encompass virtual reality (VR), augmented reality (AR), mixed reality (MR), and the like.

SUMMARY

Systems and techniques are described herein for performing optimum overlap ratio estimation for three dimensional (3D) reconstructions. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In one illustrative example, a method for image processing is provided. The method includes: obtaining pose information for an image sensor, the pose information indicating a set of viewpoints of an environment, wherein the image sensor is configured to capture frames for reconstructing an object; fitting a curve to the set of viewpoints; determining one or more characteristics of a curve; determining a direction of the image sensor based on the one or more characteristics of the curve and the set of viewpoints; determining an overlap ratio based on the one or more characteristics of the curve and the determined direction of the image sensor; and outputting the determined overlap ratio for selecting frames to be used for reconstructing the object.

As another example, an apparatus for processing sensor data is provided. The apparatus includes at least one memory and at least one processor coupled to the at least one memory. The at least one processor is configured to: obtain pose information for an image sensor, the pose information indicating a set of viewpoints of an environment, wherein the image sensor is configured to capture frames for reconstructing an object; fit a curve to the set of viewpoints; determine one or more characteristics of a curve; determine a direction of the image sensor based on the one or more characteristics of the curve and the set of viewpoints; determine an overlap ratio based on the one or more characteristics of the curve and the determined direction of the image sensor; and output the determined overlap ratio for selecting frames to be used for reconstructing the object.

In another example, a non-transitory computer-readable medium having stored thereon instructions is provided. The instructions, when executed by at least one processor, cause the at least one processor to: obtain pose information for an image sensor, the pose information indicating a set of viewpoints of an environment, wherein the image sensor is configured to capture frames for reconstructing an object; fit a curve to the set of viewpoints; determine one or more characteristics of a curve; determine a direction of the image sensor based on the one or more characteristics of the curve and the set of viewpoints; determine an overlap ratio based on the one or more characteristics of the curve and the determined direction of the image sensor; and output the determined overlap ratio for selecting frames to be used for reconstructing the object.

As another example, an apparatus for image processing is provided. The apparatus includes: means for obtaining pose information for an image sensor, the pose information indicating a set of viewpoints of an environment, wherein the image sensor is configured to capture frames for reconstructing an object; means for fitting a curve to the set of viewpoints; determining one or more characteristics of a curve; means for determining a direction of the image sensor based on the one or more characteristics of the curve and the set of viewpoints; means for determining an overlap ratio based on the one or more characteristics of the curve and the determined direction of the image sensor; and means for outputting the determined overlap ratio for selecting frames to be used for reconstructing the object.

In some aspects, one or more of the apparatuses described herein can include or be part of an extended reality device (e.g., a virtual reality (VR) device, an augmented reality (AR) device, or a mixed reality (MR) device, such as a head-mounted display (HMD) or glasses), a mobile device (e.g., a mobile telephone or other mobile device), a vehicle or a computing system or component of the vehicle, a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
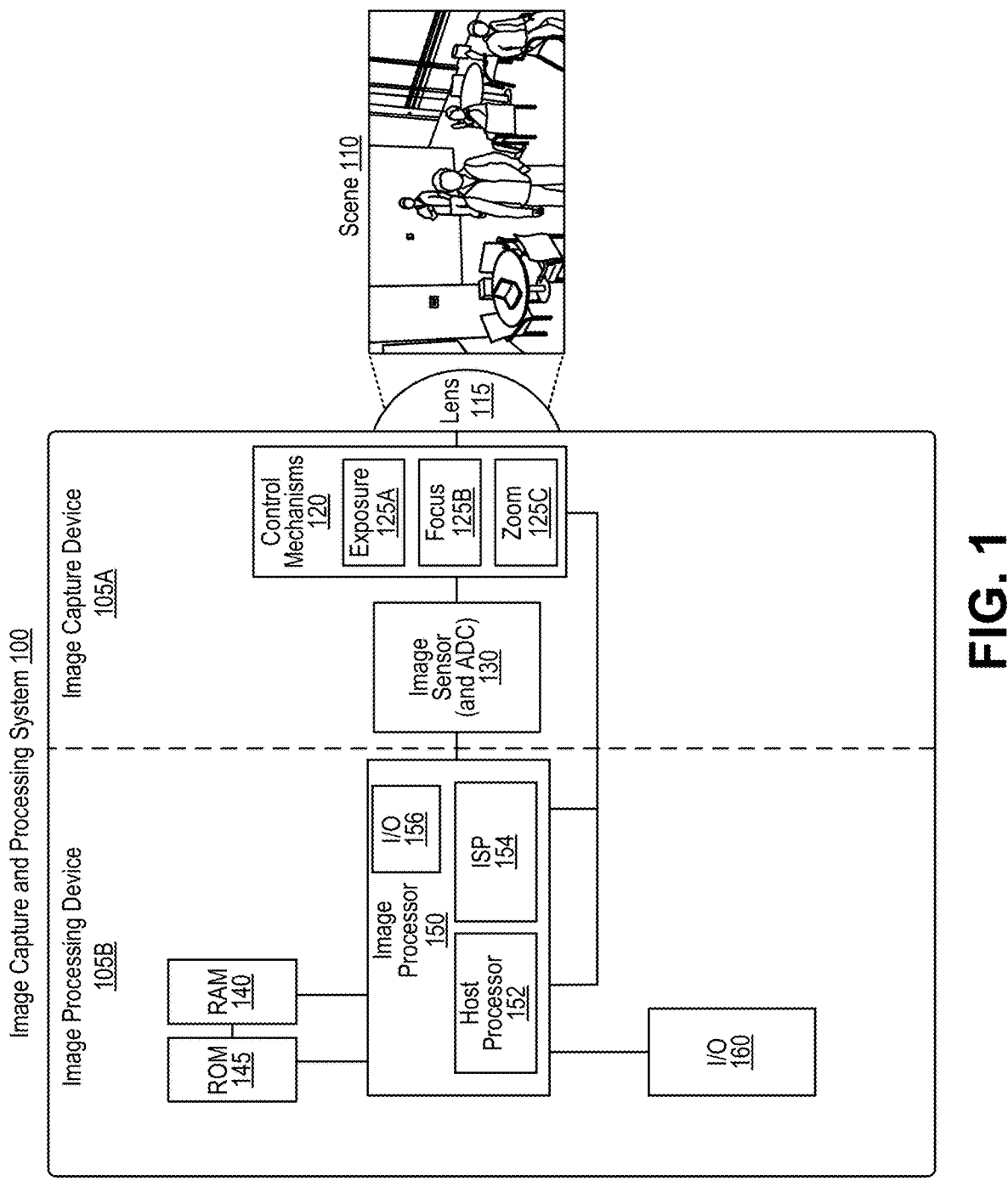
FIG. 1 is a block diagram illustrating an architecture of an image capture and processing system, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

The generation of three-dimensional (3D) models for physical objects can be useful for many systems and applications, such as extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view frames or images that include an integration of artificial or virtual graphics with the user's natural surroundings. As used herein, the terms "frame" and "image" are used interchangeably. For example, a frame or an image can be captured by a camera of a device, and can include pixel data defining objects, background, and/or other information in a scene captured by the image. AR applications allow frames to be processed to add virtual objects to the frames and to align or register the virtual objects to the frames in multiple dimensions. For instance, a real-world object that exists in reality can be represented using a model that resembles or is an exact match of the real-world object. In one example, a model of a virtual airplane representing a real airplane sitting or moving on a runway may be presented in the view of an AR device (e.g., mobile device, AR glasses, AR head-mounted display (HMD), or other device) while the user continues to view his or her natural surroundings in the AR environment. The viewer may be able to manipulate the model while viewing the real-world scene. In another example, an actual object sitting or moving on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

3D object scanning applications are available to allow users to build high quality 3D models with short processing times. A 3D model can include a 3D mesh of points with varying depths. Various devices are able to perform 3D object scanning functions. By incorporating new types of sensors with cutting edge tracking algorithms, device manufacturers (e.g., original equipment manufacturers or OEMs) are able to provide consumer-level devices (e.g., mobile phones such as smartphones, XR devices such as AR glasses and VR HMDs, among other devices) with 3D object scanning capabilities. By providing consumer-level devices with 3D object scanning functionality, many more users of varying skills are able to generate novel content for the virtual world.

To perform 3D object scanning for a target object, a device can capture a sequence of frames (e.g., a series of frames or a video) of the target object from different views (e.g., from different positions and angles). A 3D model (also referred to as a 3D reconstruction) can then be generated for the target object using the sequence of frames. In some cases, not every frame may be used for reconstruction as a difference between one frame and a next frame may not be sufficiently variant to justify a processing cost for using the frame. However, reducing a number of keyframes for reconstruction may impact a quality of reconstruction differently depending on a size of the object being reconstructed. Thus, using a single overlap ratio to select frames for use as keyframes (e.g., frames used for reconstruction of the object) may be suboptimal.

Systems, apparatuses, electronic devices, methods (also referred to as processes), and computer-readable media (collectively referred to herein as "systems and techniques") are described herein for performing optimum overlap ratio estimation. For example, as a use case for reconstruction may be varied based on a size of the object being reconstructed, an overlap ratio may be selected based on the size of the object being reconstructed. To help account for varying sizes of objects, the sizes may be divided into size categories and overlap ratios may be predefined for the size categories. In some cases, to scan an object, multiple images of the object may be captured at different angles with respect to the object and the camera may be moved about (e.g., around an object or around a user of the camera) when scanning the object.

In some cases, how the camera is moved around when scanning an object can be used to determine what size category an object being scanned should be in. Generally, when scanning a small object, the camera may be moved in a smaller arc (e.g., with a smaller radius) than when scanning a larger object. Additionally, when scanning a large object, the camera may be pointed away from a center of the arc, such as when scanning a room. Based on a size of an arc and where the camera is pointed, an estimate of a size category of the object may be determined along with the corresponding overlap ratio.

In some cases, adjusting the overlap ratio based on a size category of the object being scanned may allow a number of keyframes to be adapted to the size of the object being reconstructed. As an optimal number of keyframes to be used for reconstructing an object varies based on a size of the object, adapting the number of keyframes based on the size helps balance computing resources for reconstruction with a quality of the reconstruction.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens.

In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image capture and processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 12:
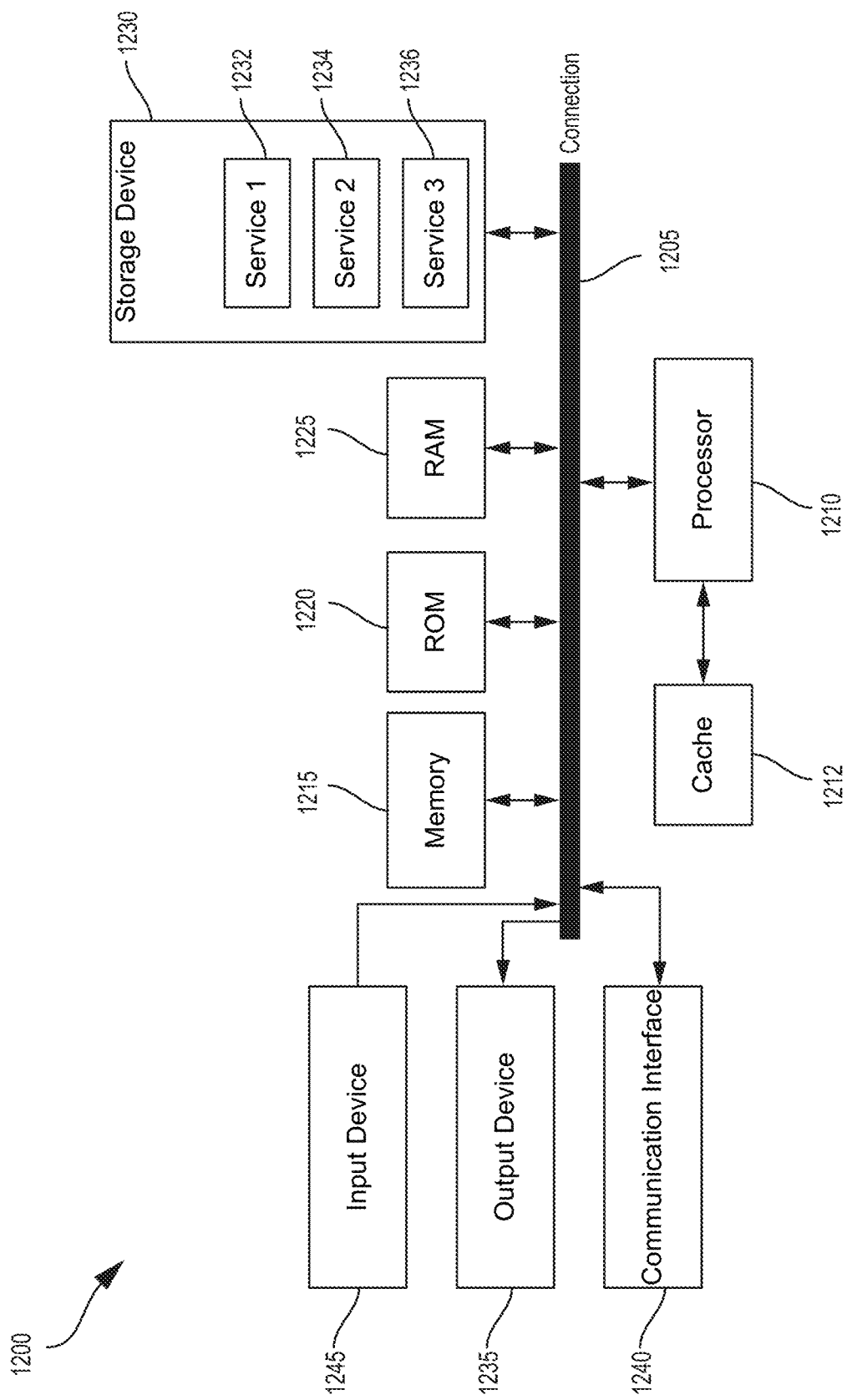
FIG. 12 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1210 discussed with respect to the computing system 1200 of FIG. 12. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
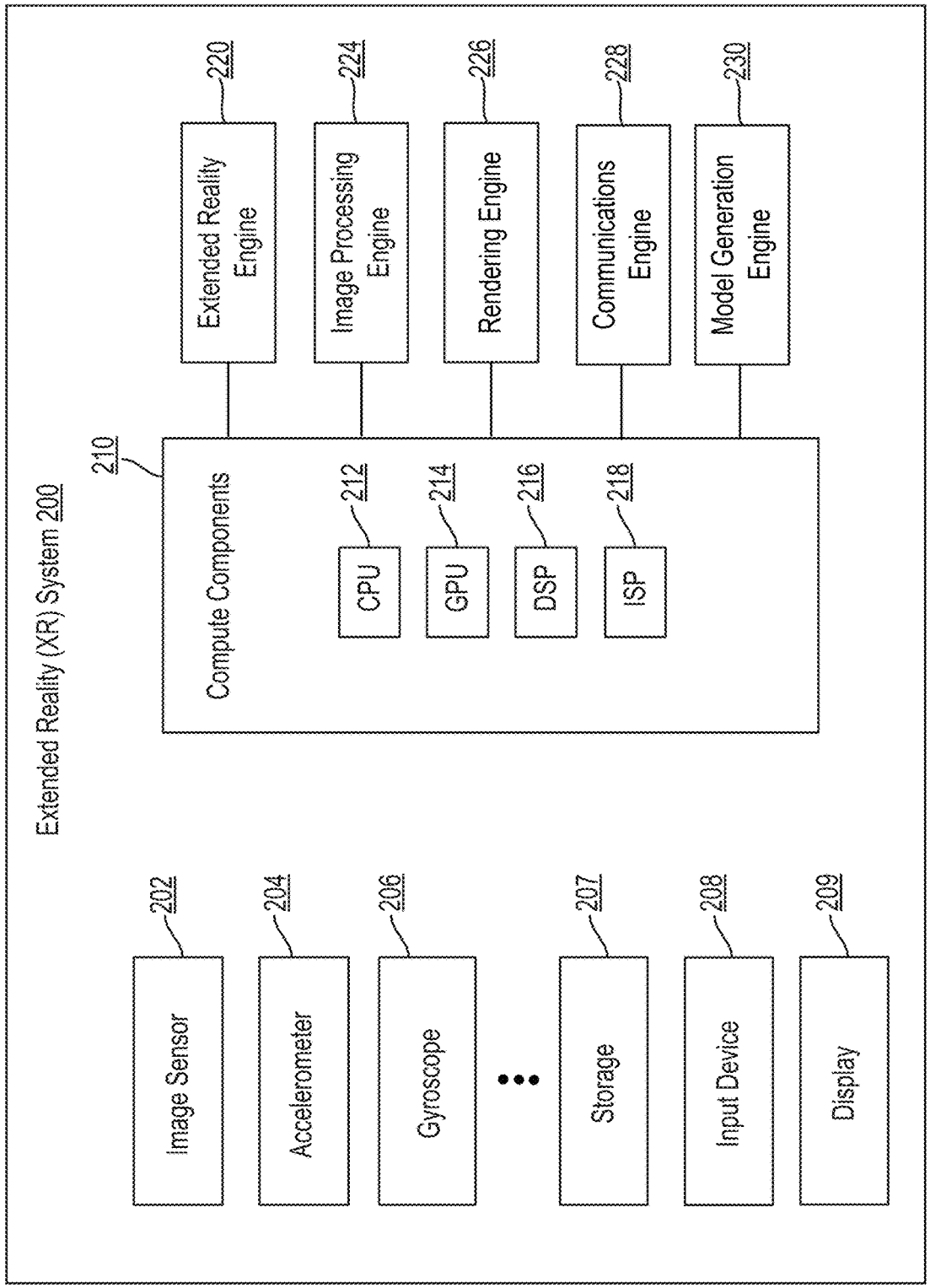
FIG. 2 is a diagram illustrating an architecture of an example extended reality (XR) system, in accordance with some examples.

FIG. 2 is a diagram illustrating an architecture of an example extended reality (XR) system 200, in accordance with some aspects of the disclosure. In some examples, the extended reality (XR) system 200 of FIG. 2 can include the image capture and processing system 100, the image capture device 105A, the image processing device 105B, or a combination thereof. In some examples, the model generation system 300 of FIG. 3 can include the image capture and processing system 100, the image capture device 105A, the image processing device 105B, or a combination thereof.

The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, a communications engine 228, and a model generation engine 230. It should be noted that the components 202-230 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1045 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1240 of FIG. 12.

In some cases, the XR system 200 may generate 3D reconstructions of objects using, for example, a sequence of frames of a target object. For example, model generation engine 230 may be configured to obtain images and generate a 3D reconstruction of an object based on the obtained images.

In some implementations, the one or more image sensors 202, the accelerometer 204, the gyroscope 206, storage 207, compute components 210, XR engine 220, image processing engine 224, rendering engine 226, communications engine 228, and model generation engine 230 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, rendering engine 226, communications engine 228, and model generation engine 230 can be part of two or more separate computing devices. For example, in some cases, some of the components 202-230 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, data from the rendering engine 226 (e.g., output frames), data from the communications engine, and/or data from the model generation engine 230 (e.g., 3D reconstructions). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, the rendering engine 226, and the model generation engine 230. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, the rendering engine 226 and/or the model generation engine 230 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/ physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 210 can extract feature points corresponding to a mobile device (e.g., XR system of FIG. 2, HMD 1010 of FIG. 10A, mobile device 1150 of FIG. 11A), or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
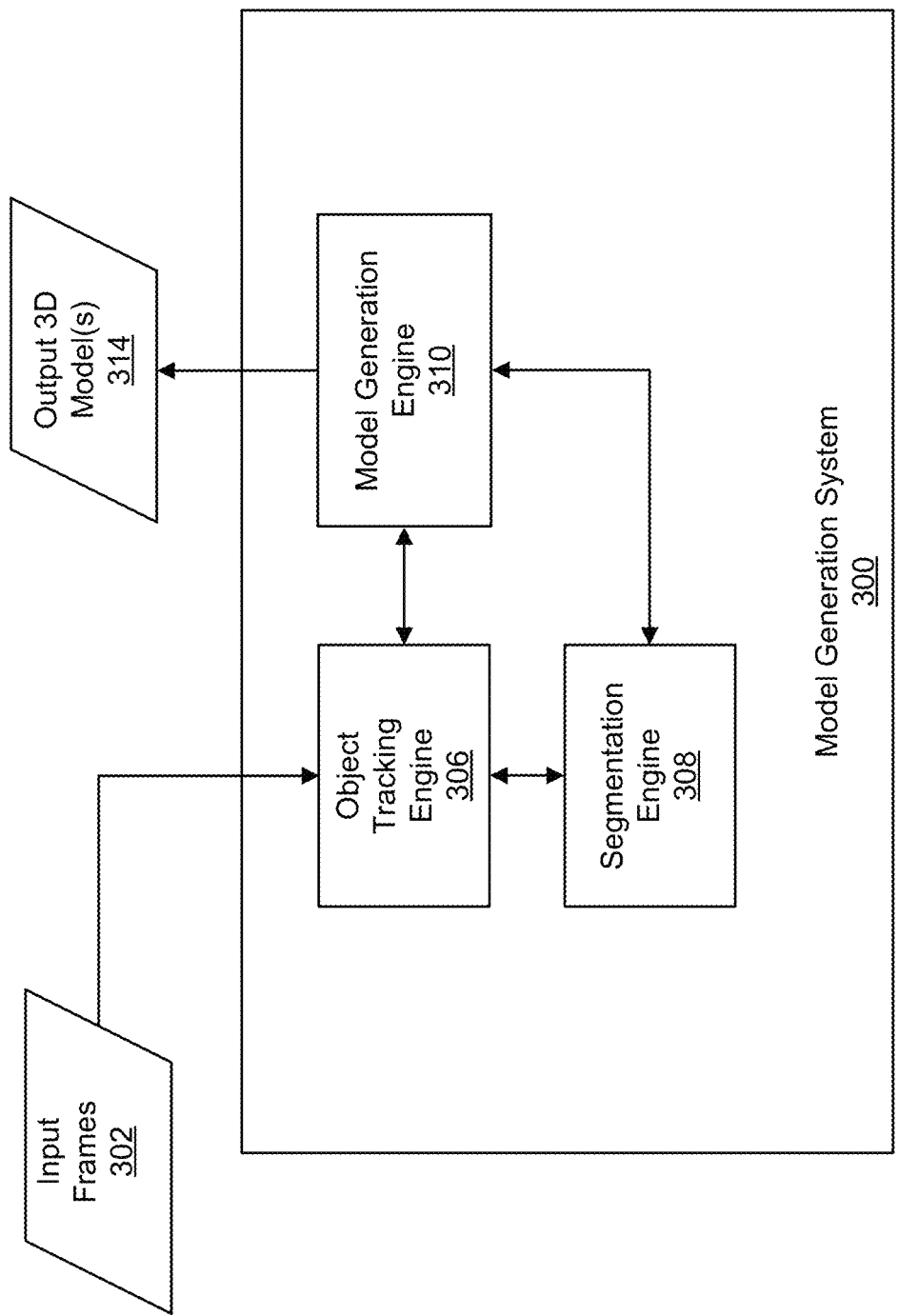
FIG. 3 is a block diagram illustrating an example of a model generation system, in accordance with some examples.

FIG. 3 is a block diagram illustrating an example model generation system 300, in accordance with aspects of the present disclosure. The model generation system 300 provides a pipeline for closed object scanning. The model generation system 300 can be used as a stand-alone solution or can be integrated into existing 3D scanning solutions. As shown in FIG. 3, the model generation system 300 includes, an object tracking engine 306, a segmentation engine 308, and a model generation engine 310. As described in more detail below, the various components of the model generation system 300 can be used to perform object scanning by processing frames (e.g., input frames 302) of an object, and generating one or more 3D models of the object.

For example, the object tracking engine 306, and the segmentation engine 308 can perform a tracking-based object segmentation process. The segmentation engine 308 segments the object from other objects, such as a plane, allowing the model generation engine 310 to generate a 3D model (of one or more output 3D models 314) of the object without the plane associated with the planar surface. Using techniques described below, the model generation system 300 can detect irregular segmentation results, is robust against drifting that can occur during tracking, and can recover from segmentation failures.

The model generation system 300 can be part of, or implemented by, a single computing device or multiple computing devices. In some examples, the model generation system 300 can include or be part of a single electronic device, such as a mobile or telephone handset (e.g., smartphone, cellular telephone, or the like), an XR device such as an HMD or AR glasses, a camera system (e.g., a digital camera, an IP camera, a video camera, a security camera, etc.), a desktop computer, a laptop or notebook computer, a tablet computer, an Internet-of-Things (IoT) device, a set-top box, a television (e.g., a network or Internet-connected television) or other display device, a digital media player, a gaming console, a video streaming device, a drone or unmanned aerial vehicle, or any other suitable electronic device. In some examples, the model generation system 300 can include one or more wireless transceivers for wireless communications, such as cellular network communications, 802.11 wi-fi communications, wireless local area network (WLAN) communications, or some combination thereof. In some implementations, the model generation system 300 can be implemented as part of the computing system 1200 shown in FIG. 12.

While the model generation system 300 is shown to include certain components, one of ordinary skill will appreciate that the model generation system 300 can include more components than those shown in FIG. 3. The components of the model generation system 300 can include software, hardware, or one or more combinations of software and hardware. For example, in some implementations, the components of the model generation system 300 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the model generation system 300.

While not shown in FIG. 3, model generation system 300 can include various compute components. The compute components can include, for example and without limitation, a central processing unit (CPU), a graphics processing unit (GPU), a digital signal processor (DSP) (such as a host processor or application processor), and/or an image signal processor (ISP). In some cases, the one or more compute components can include other electronic circuits or hardware, computer software, firmware, or any combination thereof, to perform any of the various operations described herein. The compute components can also include computing device memory, such as read only memory (ROM), random access memory (RAM), Dynamic random-access memory (DRAM), one or more cache memory devices (e.g., CPU cache or other cache components), among other memory components.

The model generation system 300 can also include one or more input/output (I/O) devices. The I/O devices can include a display screen, a keyboard, a keypad, a touchscreen, a trackpad, a touch-sensitive surface, a printer, any other output devices, any other input devices, or any combination thereof. In some examples, the I/O devices can include one or more ports, jacks, or other connectors that enable a wired connection between the model generation system 300 and one or more peripheral devices, over which the system 300 may receive data from the one or more peripheral device and/or transmit data to the one or more peripheral devices. In some examples, the I/O devices can include one or more wireless transceivers that enable a wireless connection between the model generation system 300 and one or more peripheral devices, over which the system 300 may receive data from the one or more peripheral device and/or transmit data to the one or more peripheral devices. The peripheral devices may include any of the previously-discussed types of I/O devices and may themselves be considered I/O devices once they are coupled to the ports, jacks, wireless transceivers, or other wired and/or wireless connectors.

As shown in FIG. 3, input frames 302 are input to the model generation system 300. Each frame of the input frames 302 captures an object positioned on a surface in a scene. An image capture device can capture the input frames 302 from different angles during an image capture process as the image capture device is moved around the object. For instance, a user can move the image capture device around the object as the input frames 302 are captured.

Each frame includes multiple pixels, and each pixel corresponds to a set of pixel values, such as depth values, photometric values (e.g., red-green-blue (RGB) values, intensity values, chroma values, saturation values, etc.), or a combination thereof. In some examples, the input frames 302 can include depth information in addition to or as an alternative to photometric values (e.g., RGB values). For instance, the input frames 302 can include depth maps (e.g., captured by a 3D sensor such as a depth sensor or camera), red-green-blue-depth (RGB-D) frames or images, among other types of frames that include depth information. RGB-D frames allow for the recording of depth information in addition to color and/or luminance information. In one illustrative example, a depth sensor can be used to capture multiple depth maps of the object from different angles. A depth map is an image or image channel (e.g., the depth channel in an RGB-D frame) that contains information indicating the distance of the surfaces of objects in a scene from a viewpoint such as the camera.

Figure 4:
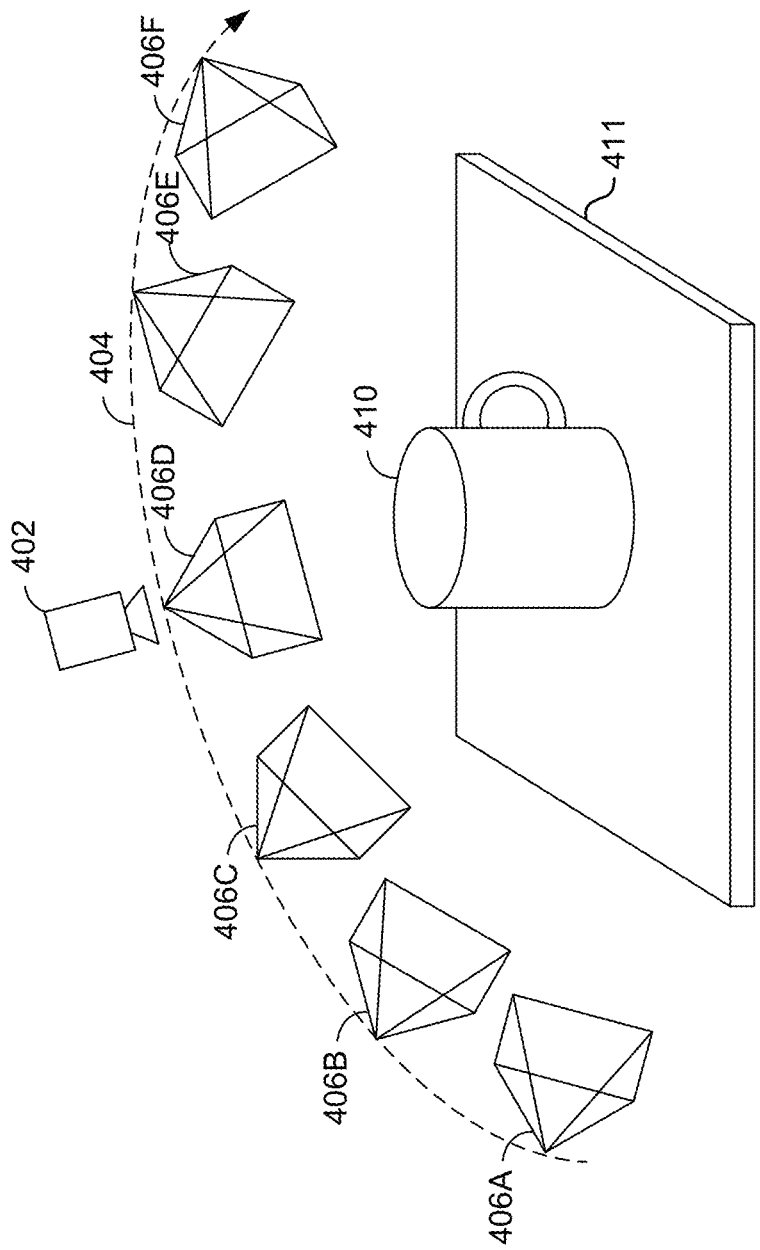
FIG. 4 is a diagram illustrating an example operation of an image capture device capturing input frames, in accordance with some examples.

FIG. 4 is a diagram illustrating an example operation of an image capture device 402 capturing input frames (e.g., the input frames 302). In some cases, the image capture device can be part of the system 300 or part of a computing device that includes the system 300. In some cases, the image capture device can be part of a separate computing device than a computing device that includes the system 300. As shown, the image capture device 402 is moved along a path 404 (e.g., shown as an arc) about or around an object 410 (a cup) on a planar surface 411. During the movement of the image capture device 402 along the path 404, the image capture device 402 is located at various positions, illustrated in FIG. 4 as camera poses 406A, 406B, 406C, 406D, 406E, and 406F. It should be noted that the number, separation, and orientation of the camera poses 406A-406F shown in FIG. 4 are shown for illustrative purposes only, and are not to be considered limiting. For example, more camera poses or fewer camera poses may be used.

The path 404 may be of any configuration, based on how the image capture device 402 is moved around the object 410. In some examples, as the image capture device 402 is moved along the path 404 from a position associated with the camera pose 406A to a position associated with the camera pose 406F, various frames of the object can be captured and used as input frames 302. For example, at the camera pose 406A, which represents an initial camera pose of the image capture device 402 at a first position along the path 404, a first frame can be captured by the image capture device 402. As the image capture device 402 continues to move along the path 404, additional frames can be captured. In some examples, frames can be continuously captured at a frame rate of the image capture device. For instance, if the frame rate of the image capture device is 30 frames per second (fps), 30 frames can be captured by the image capture device every 1 second of time. The input frames 302 can then be provided to the model generation system 300.

As noted above, the object tracking engine 306, and the segmentation engine 308 can perform a tracking-based object segmentation process using the input frames 302. In some examples, the object tracking engine 306 can track the object. As noted above, the image capture device can be moved around the object (which can be stationary on the planar surface 411 or can be moving on the planar surface 411) as the frames 302 are being captured. The tracking performed by the object tracking engine 306 can include tracking the position of the image capture device relative to the object for each frame of the input frames 302. The segmentation engine 308 can segment the object in each frame, and can provide the segmentation results to the model generation engine 310.

In some examples, object tracking is performed using all of the input frames 302, while only certain frames (referred to herein as keyframes) are used by the model generation engine 310 to generate the 3D model for the object in the input frames. For example, when capturing the frames of the object, the object can be scanned using an image capture device that captures frames at a frame rate of 30 fps or any other frame rate.

From the plurality of captured frames, one or more of the frames can be designated as keyframes. Frames of the plurality of frames other than the keyframes can be non-keyframes. In some examples, the non-keyframes can be used for tracking and/or object detection based segmentation, but not for 3D model generation. In some cases, not every frame may be used for reconstruction as a difference between one frame and a next frame, at a full frame rate of a camera (e.g., 30 to 60 fps) features of the environment generally are not sufficiently variant to justify a full reconstruction. A number of keyframes, from the plurality of captured frames, may impact reconstruction quality (e.g., how detailed the reconstructed virtual object is, how accurately the reconstructed virtual object matches with the real object, and the like) at a cost of computational resources (e.g., load, time, power, and the like). For example, using a relativity large number of keyframes can result in an accurate and detailed reconstruction while using a relatively large amount of computing resources. Similarly, using a relatively smaller number of keyframes for reconstruction can be minimize the amount of computing resource use, but can results in a lower quality reconstruction that may not be useable. For example, there may not be sufficient angles and/or perspectives of the object to obtain a useable amount of detail and features of the object may be missed. Thus, it can be useful to optimize the number of keyframes to obtain a high-quality reconstruction while balancing the amount of computing resources used.

In some cases, an optimum number of keyframes may vary based on a scale (e.g., size) of the objected being reconstructed. For example, a level of detail for reconstructing a smaller object may be fairly high as interactions with smaller objects may be performed at a closer range than for a larger object. In some cases, the number of keyframes selected for use in reconstructing an object may be described based on an overlap ratio.

Figure 5A:
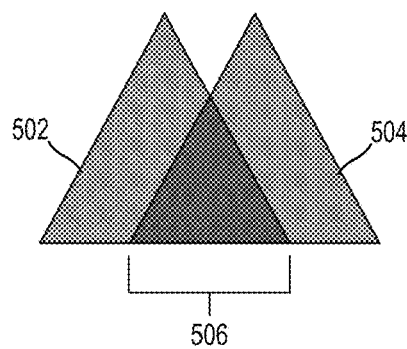
FIGS. 5A, 5B, 5C, and 5D illustrate examples of overlap ratios, in accordance with aspects of the present disclosure.

FIGS. 5A, 5B, 5C, and 5D illustrate examples of overlap ratios, in accordance with aspects of the present disclosure. In FIGS. 5A-5D, each triangle represents a frustum of a camera (not shown) a scene is captured with. The frustum of an image represents a portion of the environment (e.g., the scene) visible in the image. FIG. 5A includes two frustrums 502 and 504 from two different locations. As shown, a portion of frustrum 502 and frustrum 504 overlap (e.g., a same part of the environment appears in an image captured with frustrum 502 and frustrum 504). The overlap ratio refers to an amount of the portion of the frustrums which overlap 506.

Figure 5B:
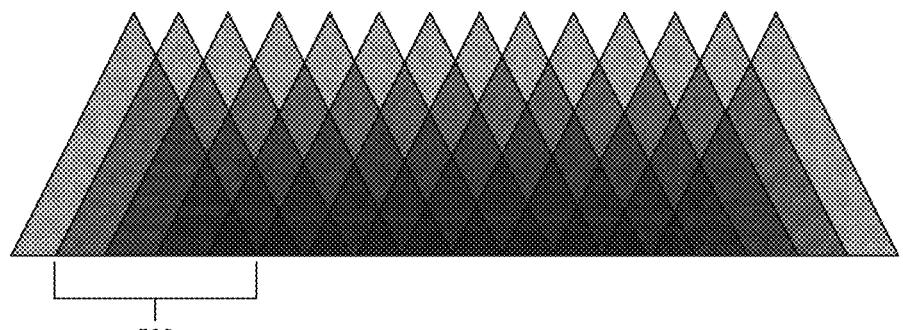
Figure 5C:
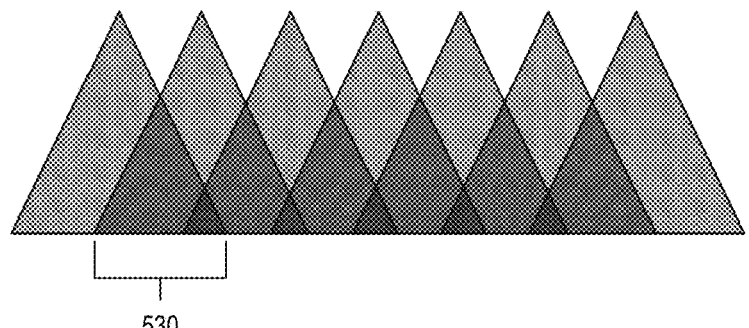
Figure 5D:
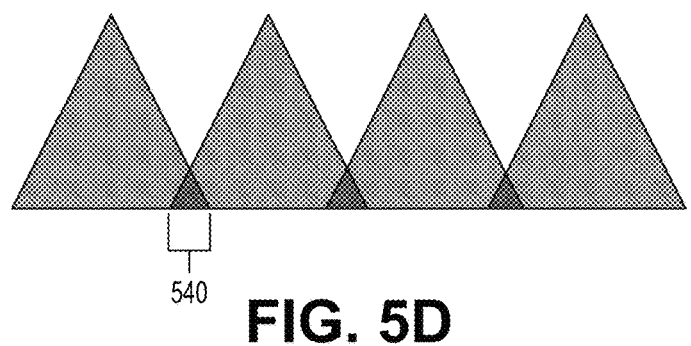

As shown in FIGS. 5B-5D, in some cases, the overlap ratio may be in reference to a variable X, which represents an amount of overlap 520 between frustrums where all of the frames of a video are used for reconstruction. Thus, the overlap ratio shown in FIG. 5B is X. FIG. 5C illustrates where half of the frames of the video (e.g., every other frame) are used for reconstruction and thus has an overlap ratio 530 of X/2. Similarly, 5D illustrates where one in four frames are used for reconstruction and thus has an overlap ratio 540 of X/4. Thus, a lower the overlap ratio, the fewer keyframes are used. Thus, optimizing the overlap ratio may be used to adjust an amount of keyframes used for reconstruction. Dynamically determining the overlap ratio during image capture allows the number of selected keyframes used for reconstructing an object to be selected and adjusted in real-time as images of the object being reconstructed are captured. Of note, FIG. 5C and FIG. 5D show only frames (e.g., frustrums of keyframes) which are used for reconstruction and frames that are not used for reconstruction are omitted. For FIG. 5C and FIG. 5D, frames (both used and not used for reconstruction) are captured at a rate as shown in FIG. 5B (e.g., based on a frame rate of the camera).

In some cases, the overlap ratio may be specified directly. For example, if the overlap ratio is specified at 50%, then keyframes may be captured once a camera has moved sufficiently that a threshold 50% of the frustum captured by the camera in a current image was not captured in a previous image. In some cases, when the overlap ratio is directly specified, the overlap ratio may be framerate independent. That is, the overlap ratio is determined by a change in the viewing angle rather than the frame rate. Thus, no additional keyframes may be generated for a long as the camera does not move (relative to the environment), regardless to how many frames are captured while the camera is motionless. If the camera is then moved a sufficient angle such that half of the view is new, then an additional keyframe may be generated. In some cases, whether the camera has move sufficiently so that the additional keyframe should be generated may be determined based on a pose of the camera (e.g., 6DoF (or 3DoF) data).

As indicated above, the optimum number of keyframes may vary based on the scale of the object being reconstructed as a constant overlap ratio may produce a good quality reconstruction for an object of a certain size, while providing a lower quality reconstruction for another object of a different size. For example, a level of detail appropriate for an object that is sized to be held in a hand may be higher than a level of detail appropriate for another object that is about a size of a table. Additionally, reducing the overlap ratio (e.g., from 50% to 25%) impacts reconstruction of smaller objects more than for larger objects.

To help balance computing resources and quality of reconstruction, the overlap ratio (and thus number of keyframes) for reconstructing an object may be varied based on a size of the object. To help account for varying sizes of objects, the sizes may be divided into size categories, such as small sized objects, medium sized objects, and large sized objects. In some cases, small sized objects may be objects that are of a size that can approximately be held in hand (e.g., approximately 5 cm to 30 cm), medium sized objects may be objects that are larger than small sized objects up to approximately a size of a table (e.g., approximately 2 m), and large objects may be objects which are larger, such as a room, car, house, etc. It should be understood that the categories for small, medium, and large objects are for example only and fewer or additional categories could be defined. In some cases, a number of categories and the sizes of objects in the categories may be determined experimentally based on, for example, how different overlap ratios influence the quality of reconstruction of objects of a certain size.

Figure 6:
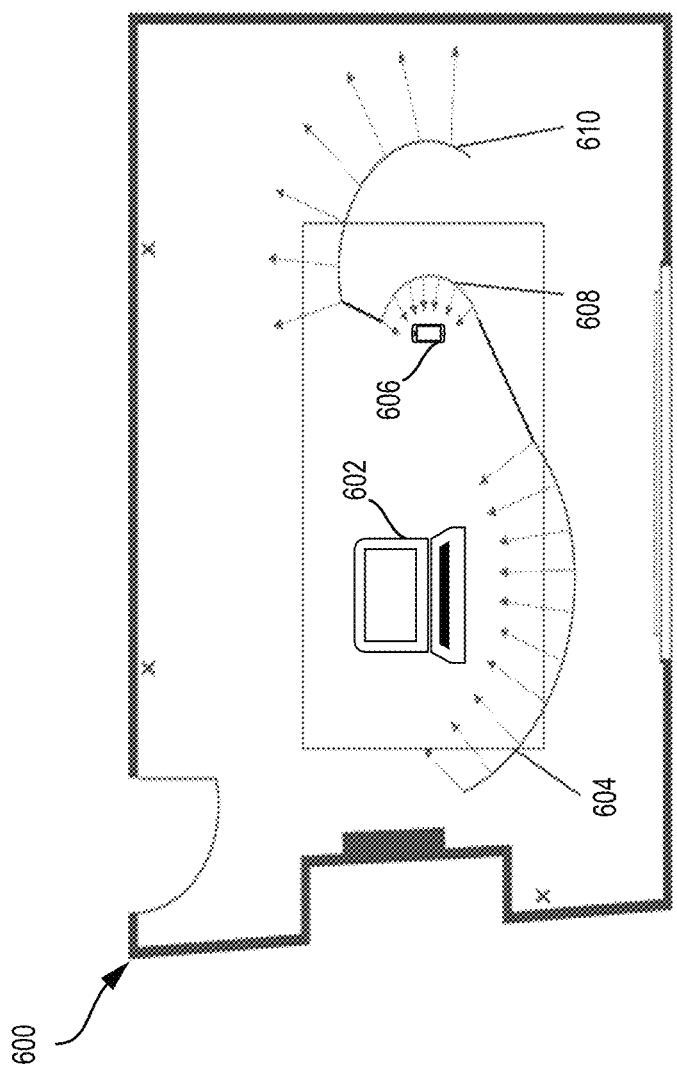
FIG. 6 is an overhead view of a room illustrating scanning objects for reconstruction, in accordance with aspects of the present disclosure.

FIG. 6 is an overhead view of a room 600 illustrating scanning objects for reconstruction, in accordance with aspects of the present disclosure. In some cases, how an object is scanned for reconstruction may indicate a size of the object being scanned. Generally, to scan an object, multiple images of the object may be captured at different angles with respect to the object. In some cases, this may be performed by moving a scanning device, such as a camera, about the object being scanned. For example, to scan a medium sized object 602, such as a laptop, a camera may be moved around the medium sized object 602 in a first arc 604. This first arc may be associated with a first curvature.

The camera may then be moved around the small sized object 606 in a second arc 608. In some cases, when attempting to scan a smaller object for reconstruction the camera may be moved closer, as compared to with medium or large sized objects, to better capture details of the smaller object. In some cases, prompts or instructions may also be used to encourage a user of the camera to position the camera such that the object being scanned fills a certain part of the image (e.g., as displayed on a screen and captured). Thus, in some cases, the second arc 608 around the small sized object 606 may have more curvature (e.g., smaller radius) than the first curvature of the first arc 604. In some cases, the scan distance around the medium sized object 602 is approximately constant and the camera is pointed towards the inside of the arc. Similarly, the scan distance around the small sized object 606 is approximately constant and the camera is pointed towards the inside of the arc. In some cases, the camera may, during scanning, prompt a user of the camera to maintain the scan distance, for example, via a user interface. In some cases, when attempting to scan a large sized object for reconstruction, such as the room 600, the camera may be moved around a user of the camera such that the camera is moved in a third arc 610 with the camara pointed towards the outside of the arc. Based on the observations of how scanning may be performed discussed with respect to FIG. 6, a technique for optimizing the overlap ratio based on a scanning use case may be designed.

Figure 7:
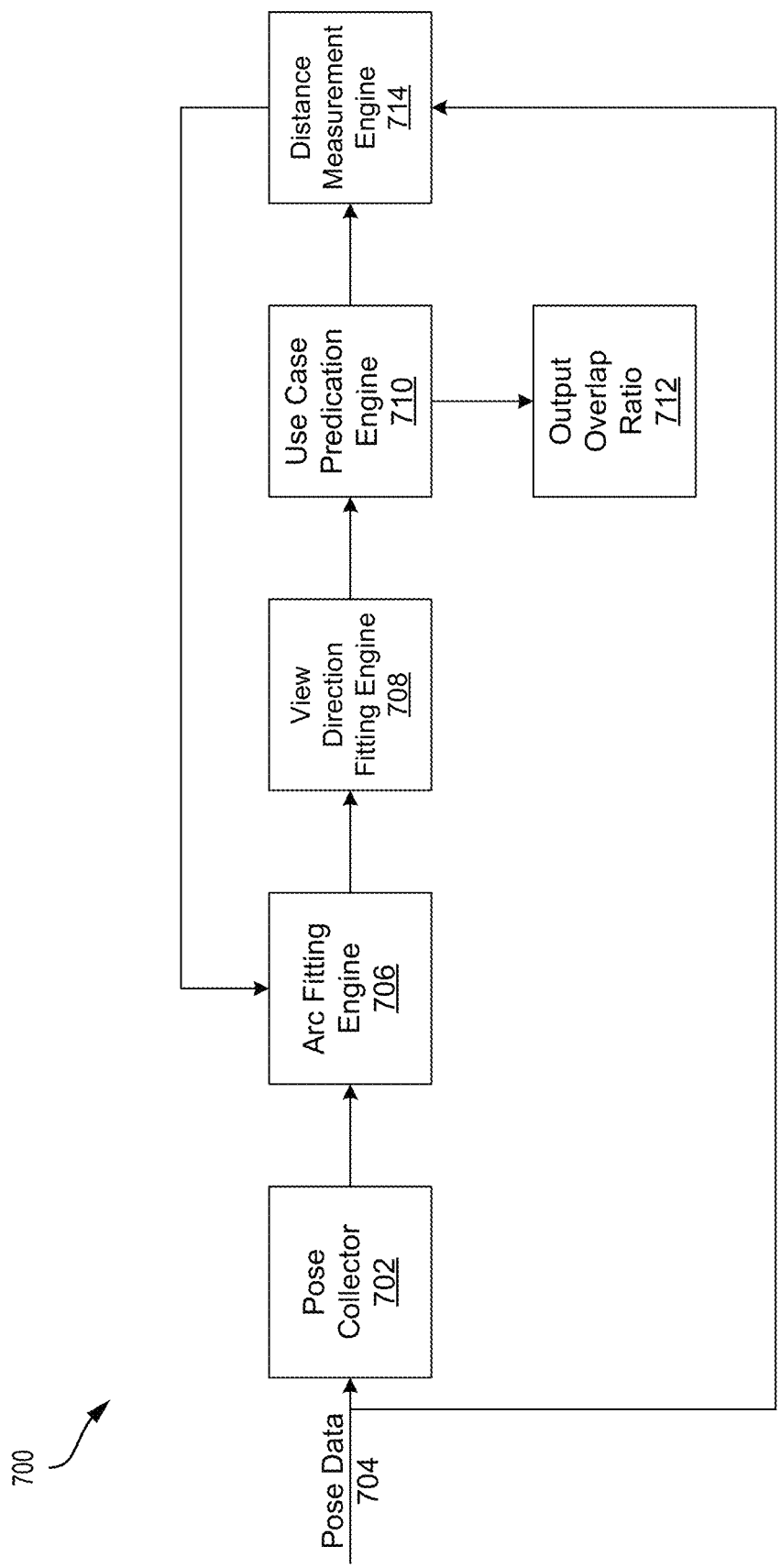
FIG. 7 is a block diagram illustrating an architecture of an example overlap ratio adjustment system for optimizing an overlap ratio, in accordance with aspects of the present disclosure.

FIG. 7 is a block diagram illustrating an architecture of an example overlap ratio adjustment system 700 for optimizing an overlap ratio, in accordance with aspects of the present disclosure. In some cases, the overlap ratio adjustment system 700 may be a part of a model generation system, such as model generation system 300, or a component thereof. In the overlap ratio adjustment system 700, a pose collector 702 may collect pose data 704 regarding a pose of a camera. The pose data 704 may indicate a viewpoint (e.g., direction/angle/orientation) of the camera indicating where the camera is facing for capturing images. In some cases, the pose data 704 may be determined based on images captured by the cameras and/or output of one or more sensors, as discussed above with respect to FIG. 2.

The pose collector 702 may collect a set of N viewpoints and pass the set of N viewpoints to an arc fitting engine 706. In some cases, N may be predetermined. In some cases, N may be predetermined based on a number of points use to fit an arc by the arc fitting engine 706. The arc fitting engine 706 attempts to fit an arc to the viewpoints. For example, the viewpoints may include relative location information indicating how locations of the viewpoints vary with respect to other viewpoints and a path between these locations may be plotted. In some cases, the arc fitting engine 706 attempts to find a circle which most closely resembles the path between the N viewpoints. For example, the arc fitting engine 706 may apply a Taubin curve fitting algorithm to fit a circle to the viewpoints. Other arc or curve fitting techniques may also be used. If the arc fitting engine 706 finds a fitting circle, a center and radius of the fitting circle may be found. This information about the fitting circle along with the set of N viewpoints may be passed to a view direction fitting engine 708. If the arc fitting engine 706 cannot fit a circle to the path between the N viewpoints (e.g., if the camera is moving in a straight line), then the set of N viewpoints may be dropped and the overlap ratio may be set to a default overlap ratio or the large sized object overlap ratio.

The view direction fitting engine 708 may attempt to determine an indication of a camera direction. For example, the view direction fitting engine 708 may determine whether the camera is pointed inward toward the center of the fitting circle, or outward away from the fitting circle. The view direction fitting engine 708 may pass the indication of the camera direction along with the information about the fitting circle may be passed on to a use case prediction engine 710.

In some cases, the use case prediction engine 710 may predict an overlap ratio for output 712. In some cases, the use case prediction engine 710 may predict the overlap ratio based on, for example, the indication of the camera direction and a characteristic of the fitting circle. In some cases, the characteristic of the fitting circle may include a radius of the fitting circle, a diameter of the fitting circle, a center of the fitting circle, and the like. For example, if the radius of the fitting circle is within a first range of lengths (e.g., radii), such as 0 meters to N meters, and the camera is pointed inwards (e.g., pointed in an expected direction, here inwards), then the use case prediction engine 710 may predict that the camera is attempting to reconstruct a small sized object. The use case prediction engine 710 may output 712 an overlap ratio, R, suitable for such small sized objects. Similarly, if the radius of the fitting circle is within a second range of lengths, such as N meters to M meters, and the camera is pointed inwards, then the use case prediction engine 710 may predict that the camera is attempting to reconstruct a medium sized object. The use case prediction engine 710 may output 712 an overlap ratio S suitable for such medium sized objects (e.g., an overlap ratio where S<R). As another example, if the radius of the fitting circle is within a third range of lengths (or any length), such as 0 meters to M meters, and the camera is pointed outwards, the use case prediction engine 710 may predict that the camera is attempting to reconstruct a large sized object. In some cases, the use case prediction engine 710 may predict that the camera is attempting to reconstruct a large sized object when the camera is pointed outwards from the fitting circle. The use case prediction engine 710 may output 712 an overlap ratio, T, suitable for large sized objects (e.g., an overlap ratio where T<S). In some cases, the range of lengths, expected direction the camera is pointing, and corresponding overlap ratio are predetermined and stored, for example, in a table.

In some cases, after an overlap ratio is outputted 712, a distance measurement engine 714 may estimate whether a distance to the object being scanned is deviating to determine whether scanning of the object has stopped or if a new arc may need to be fitted. For example, the distance measurement engine 714 may receive pose data 704. The distance measurement engine 714 may also receive information about the fitting circle. In some cases, the pose data 704 may be separate from the set of N viewpoints collected from the pose collector 702. Based on the pose data 704, the distance measurement engine 714 may determine whether a distance between the camera and the center of the fitting circle is deviating (e.g., increasing or decreasing. If the distance deviates beyond a threshold amount, then the distance measurement engine 714 may cause the arc fitting engine 706 to attempt to refit the arc to redetermine the overlap ratio.

Figure 8A:
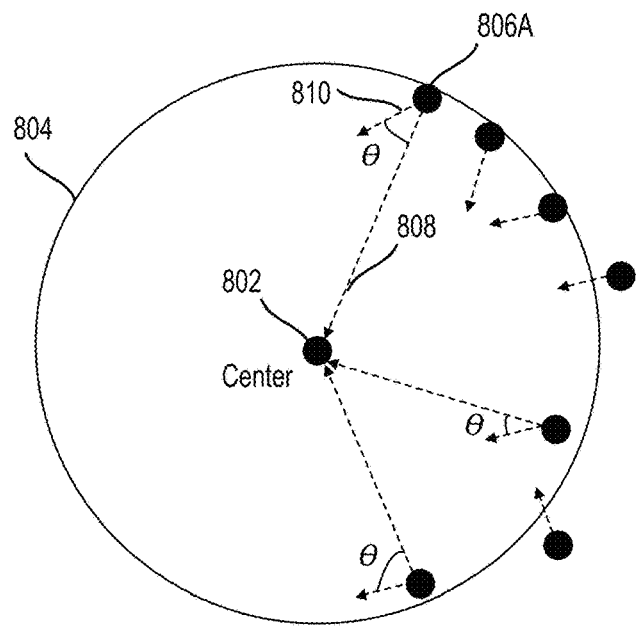
FIGS. 8A and 8B illustrate sets of viewpoints on fitting circles, in accordance with aspects of the present disclosure.
Figure 8B:
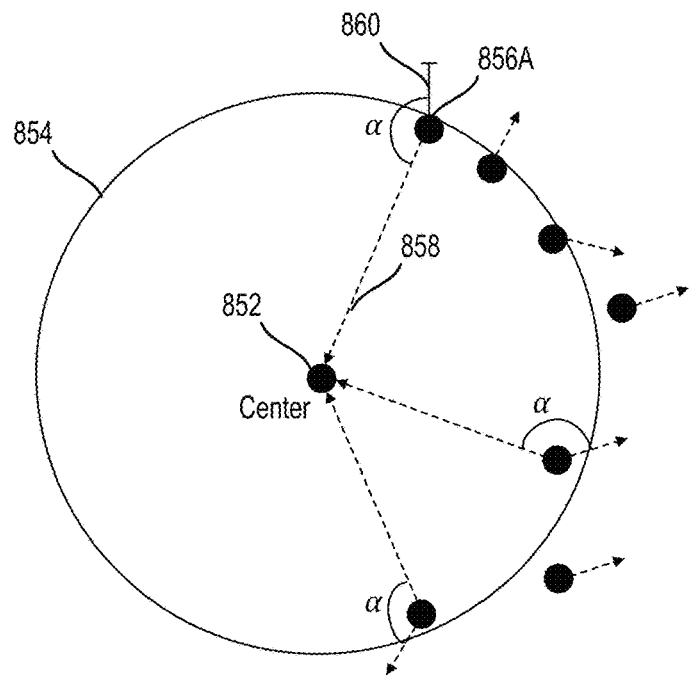

FIGS. 8A and 8B illustrate sets of viewpoints on fitting circles, in accordance with aspects of the present disclosure. As indicated above, a view direction fitting engine 708 may determine whether the camera is pointed inward toward the center of the fitting circle. As an example of the determination, the view direction fitting engine 708 may receive the information about the fitting circle, including the center 802 of the fitting circle along with the set of N viewpoints. FIG. 8A shows the set of N viewpoints along plotted on the fitting circle 804. The view direction fitting engine 708 may determine a center vector 808 from a viewpoint 806A to the center 802 of the fitting circle 804. A direction of the determined center vector 808 may then be compared to a direction 810 of the pose corresponding to the viewpoint 806A to determine an angle θ between the direction of the determined center vector 808 and the direction 810 of the pose. If θ is <90 degrees, then the camera may be determined to be pointed inward.

Similarly, FIG. 8B shows the set of N viewpoints along plotted on the fitting circle 854. In fitting circle 854, a center vector 858 from a viewpoint 856A to the center 852 of the fitting circle 854. A direction of the determined center vector 858 may then be compared to a direction 860 of the pose corresponding to the viewpoint 856A to determine an angle α between the direction of the determined center vector 858 and the direction 860 of the pose. In FIG. 8B, as α is >90 degrees and α<180, then the camera may be determined to be pointed outward.

Figure 9:
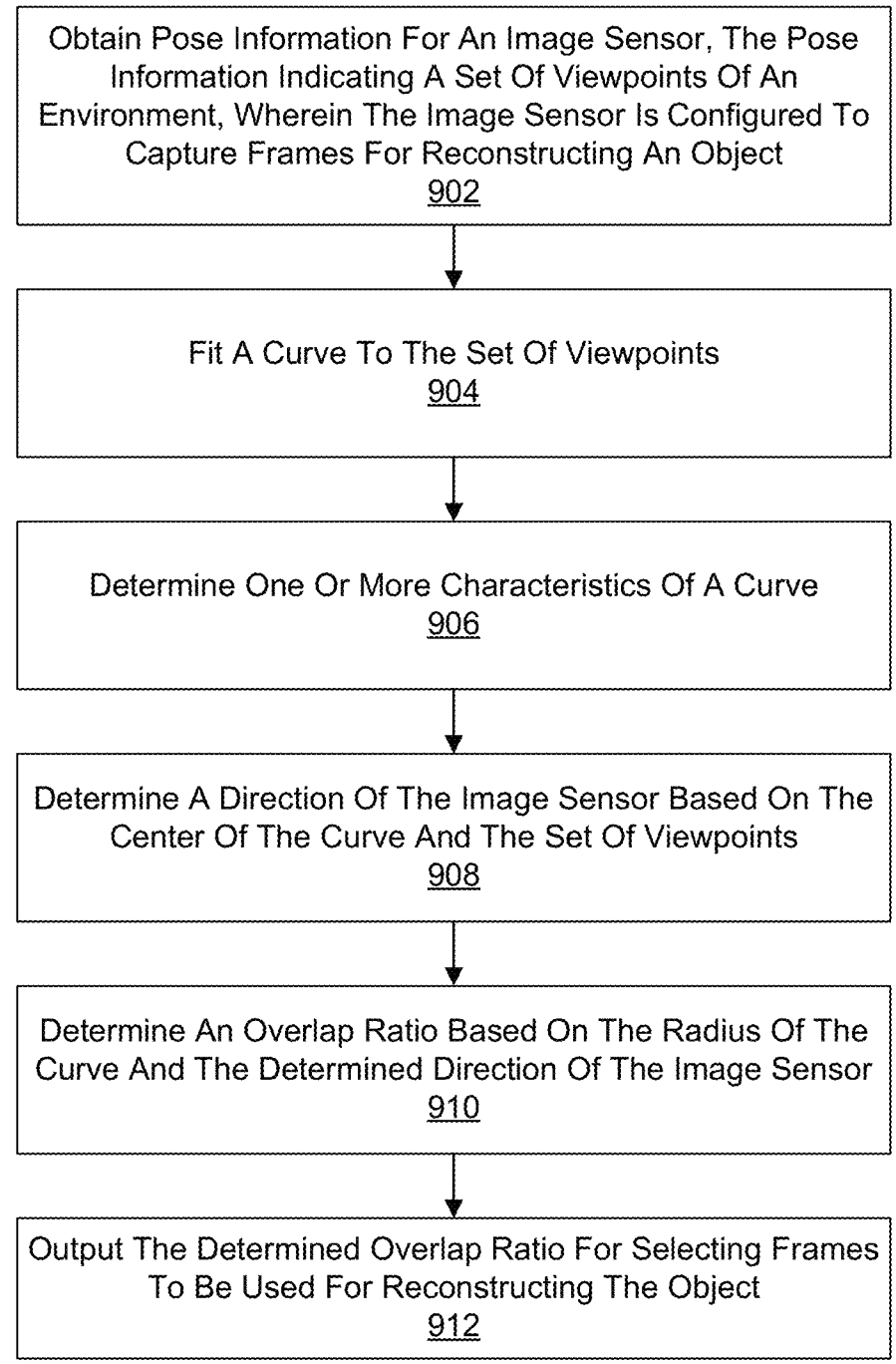
FIG. 9 is a flow diagram illustrating a process for image processing, in accordance with aspects of the present disclosure.

FIG. 9 is a flow diagram illustrating a process 900 for image processing, in accordance with aspects of the present disclosure. The process 900 may be performed by a computing device (or apparatus) or a component (e.g., a chipset, codec, etc.) of the computing device (e.g., image processor

150 of FIG. 1, compute components 210 of FIG. 2, processor 1210 of FIG. 12, or other computing device). The computing device may be a mobile device (e.g., a mobile phone), a network-connected wearable such as a watch, an extended reality (XR) device such as a virtual reality (VR) device or augmented reality (AR) device (e.g., HMD 1010 of FIG. 10A, 10B, mobile handset 1150 of FIG. 11A, 11B), a vehicle or component or system of a vehicle, or other type of computing device. The operations of the process 900 may be implemented as software components that are executed and run on one or more processors (e.g., image processor 150 of FIG. 1, the CPU 212, the GPU 214, the DSP 216, and/or the ISP 218 of FIG. 2, the processor 1210 of FIG. 12, and/or other processor(s)). In some cases, the operations of the process 900 can be implemented by the computing system 1200 of FIG. 12.

Figure 10A:
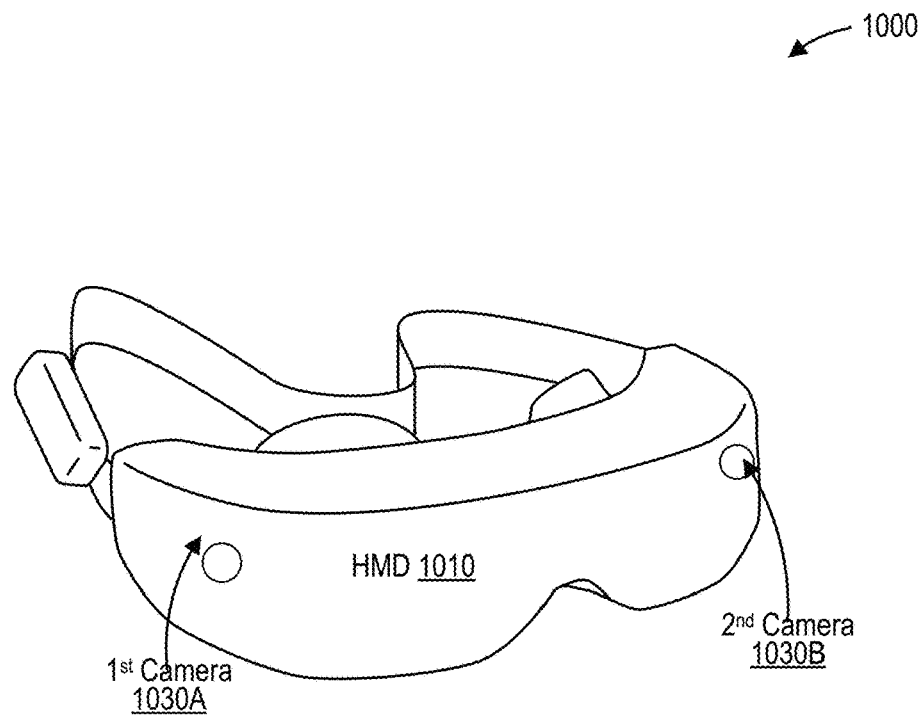
FIG. 10A is a perspective diagram illustrating a head-mounted display (HMD) that performs feature tracking and/or visual simultaneous localization and mapping (VSLAM), in accordance with some examples.
Figure 10B:
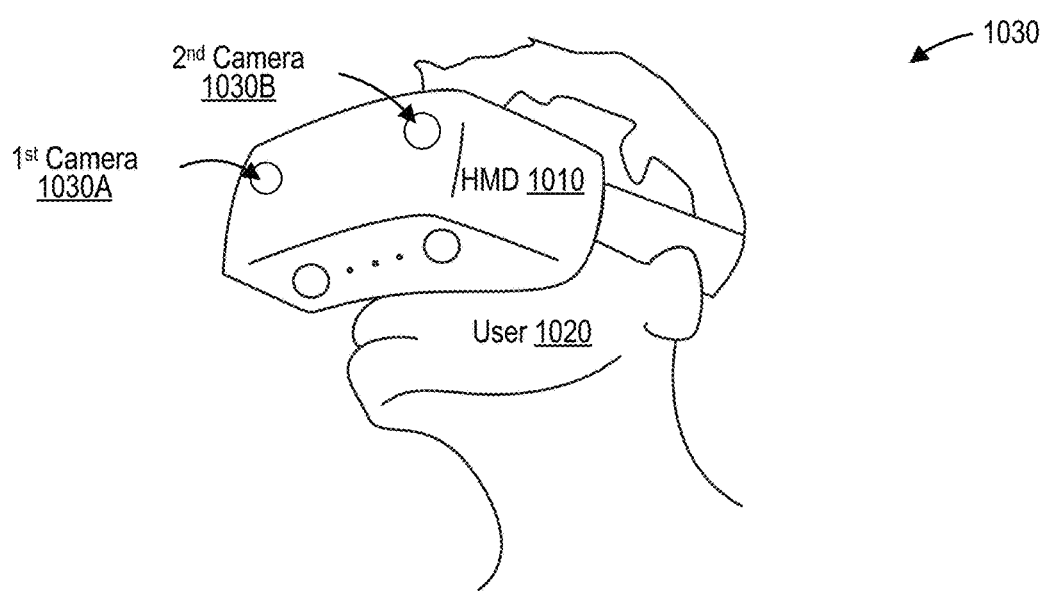
FIG. 10B is a perspective diagram illustrating the head-mounted display (HMD) of FIG. 10A being worn by a user, in accordance with some examples.
Figure 11A:
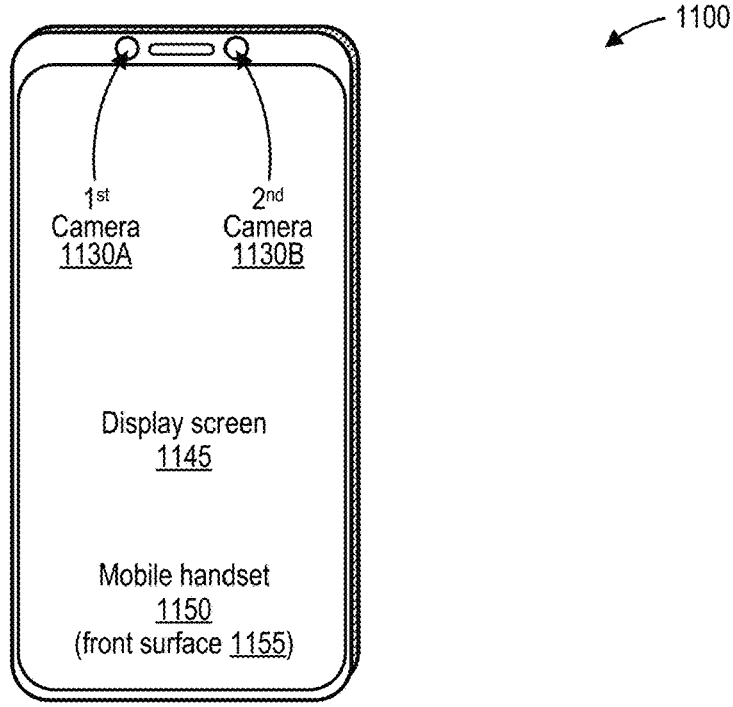
FIG. 11A is a perspective diagram illustrating a front surface of a mobile device that performs feature tracking and/or visual simultaneous localization and mapping (VSLAM) using one or more front-facing cameras, in accordance with some examples.
Figure 11B:
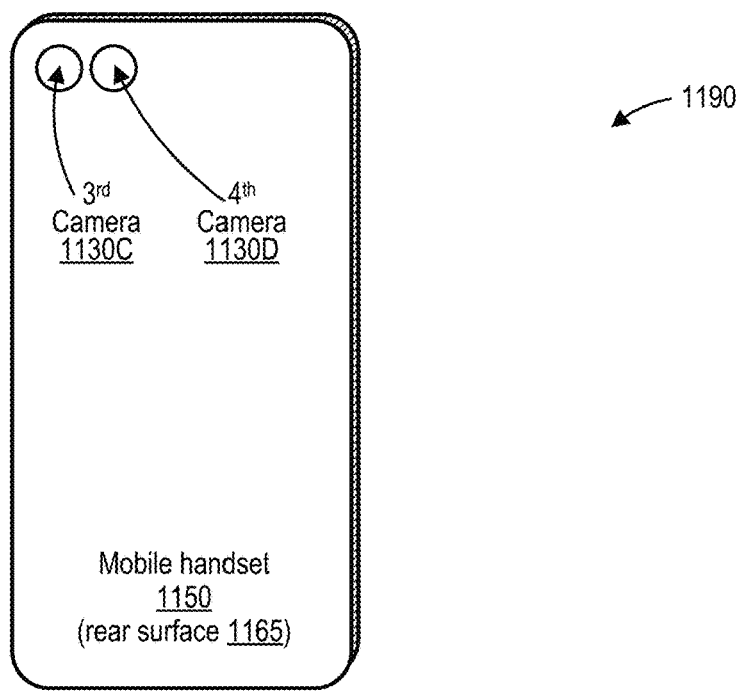
FIG. 11B is a perspective diagram illustrating a rear surface of a mobile device, in accordance with aspects of the present disclosure.

At block 902, the computing device (or component thereof) may obtain pose information for an image sensor (e.g., image capture device 105A of FIG. 1, image sensor 202 of FIG. 2, cameras 1030A, 1030B of FIG. 10A, 10B, and cameras 1130A, 1130B of FIG. 11A, 11B). In some cases, the pose information indicates a set of viewpoints (e.g., viewpoints 806 of FIG. 8A, 8B) of an environment. In some cases, the image sensor is configured to capture frames for reconstructing an object. In some cases, viewpoints of the set of viewpoints include location information and direction information for the image sensor. In some cases, the pose information comprises 6-Degrees-Of-Freedom (6DOF) information.

At block 904, the computing device (or component thereof) may fit a curve to the set of viewpoints. In some cases, to fit the curve, computing device (or component thereof) may determine a path for the set of viewpoints based on the location information. In some cases, to fit the curve, computing device (or component thereof) may apply a curve fitting algorithm to the path.

At block 906, the computing device (or component thereof) may determine one or more characteristics of a curve. In some cases, to determine the one or more characteristics of the curve, the computing device (or component thereof) may determine a center of the curve and a radius of the curve. In some cases, the direction of the image sensor is determined based on the determined center of the curve. In some cases, the overlap ratio is determined based on the radius of the curve.

At block 908, the computing device (or component thereof) may determine a direction of the image sensor based on the one or more characteristics of the curve and the set of viewpoints. In some cases, to determine the direction of the image sensor, computing device (or component thereof) may determine a vector between a location of a viewpoint about the curve and the center of the curve. In some cases, to determine the direction of the image sensor, computing device (or component thereof) may compare the vector to the direction associated with the viewpoint.

At block 910, the computing device (or component thereof) may determine an overlap ratio based on the one or more characteristics of the curve and the determined direction of the image sensor. In some cases, to determine the overlap ratio, computing device (or component thereof) may determine the radius of the curve is within a range of radii. In some cases, to determine the overlap ratio, computing device (or component thereof) may determine the direction of the image sensor is pointed in an expected direction. In some cases, the overlap ratio is determined based on a set of size categories. In some cases, the overlap ratio is predetermined for size categories of the set of size categories. In some cases, a number of viewpoints, of the set of viewpoints, is predetermined.

At block 912, the computing device (or component thereof) may output the determined overlap ratio for selecting frames to be used for reconstructing the object. The computing device (or component thereof) may obtain additional pose information for the image sensor. The computing device (or component thereof) may determine that a distance from the center of the curve to a viewpoint indicated by the additional pose information has deviated from the radius of the curve more than a threshold amount. The computing device (or component thereof) may refit another curve based on the viewpoint. FIG. 10A is a perspective diagram 1000 illustrating a head-mounted display (HMD) 1010 that performs feature tracking and/or visual simultaneous localization and mapping (VSLAM), in accordance with some examples. The HMD 1010 may be, for example, an augmented reality (AR) headset, a virtual reality (VR) headset, a mixed reality (MR) headset, an extended reality (XR) headset, or some combination thereof. The HMD 1010 may be an example of an XR system 200, a model generation system 300, or a combination thereof. The HMD 1010 includes a first camera 1030A and a second camera 1030B along a front portion of the HMD 1010. The first camera 1030A and the second camera 1030B may be two of the one or more cameras. In some examples, the HMD 1010 may only have a single camera. In some examples, the HMD 1010 may include one or more additional cameras in addition to the first camera 1030A and the second camera 1030B. In some examples, the HMD 1010 may include one or more additional sensors in addition to the first camera 1030A and the second camera 1030B.

FIG. 10B is a perspective diagram 1030 illustrating the head-mounted display (HMD) 1010 of FIG. 10A being worn by a user 1020, in accordance with some examples. The user 1020 wears the HMD 1010 on the user 1020's head over the user 1020's eyes. The HMD 1010 can capture images with the first camera 1030A and the second camera 1030B. In some examples, the HMD 1010 displays one or more display images toward the user 1020's eyes that are based on the images captured by the first camera 1030A and the second camera 1030B. The display images may provide a stereoscopic view of the environment, in some cases with information overlaid and/or with other modifications. For example, the HMD 1010 can display a first display image to the user 1020's right eye, the first display image based on an image captured by the first camera 1030A. The HMD 1010 can display a second display image to the user 1020's left eye, the second display image based on an image captured by the second camera 1030B. For instance, the HMD 1010 may provide overlaid information in the display images overlaid over the images captured by the first camera 1030A and the second camera 1030B.

The HMD 1010 may include no wheels, propellers or other conveyance of its own. Instead, the HMD 1010 relies on the movements of the user 1020 to move the HMD 1010 about the environment. In some cases, for instance where the HMD 1010 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. Even if an environment is virtual, SLAM techniques may still be valuable, as the virtual environment can be unmapped and/or may have been generated by a device other than the HMD 1010, such as a remote server or console associated with a video game or video game platform. In some cases, feature tracking and/or SLAM may be performed in a virtual environment even by a vehicle or other device that has its own physical conveyance system that allows it to physically move about a physical environment. For example, SLAM may be performed in a virtual environment to test whether a model generation system 300 is working properly without wasting time or energy on movement and without wearing out a physical conveyance system.

FIG. 11A is a perspective diagram 1100 illustrating a front surface 1155 of a mobile device 1150 that performs features described here, including, for example, feature tracking and/or visual simultaneous localization and mapping (VSLAM) using one or more front-facing cameras 1130A-B, in accordance with some examples. The mobile device 1150 may be, for example, a cellular telephone, a satellite phone, a portable gaming console, a music player, a health tracking device, a wearable device, a wireless communication device, a laptop, a mobile device, any other type of computing device or computing system 1300 discussed herein, or a combination thereof. The front surface 1155 of the mobile device 1150 includes a display screen 1145. The front surface 1155 of the mobile device 1150 includes a first camera 1130A and a second camera 1130B. The first camera 1130A and the second camera 1130B are illustrated in a bezel around the display screen 1145 on the front surface 1155 of the mobile device 1150. In some examples, the first camera 1130A and the second camera 1130B can be positioned in a notch or cutout that is cut out from the display screen 1145 on the front surface 1155 of the mobile device 1150. In some examples, the first camera 1130A and the second camera 1130B can be under-display cameras that are positioned between the display screen 1145 and the rest of the mobile device 1150, so that light passes through a portion of the display screen 1145 before reaching the first camera 1130A and the second camera 1130B. The first camera 1130A and the second camera 1130B of the perspective diagram 1100 are front-facing cameras. The first camera 1130A and the second camera 1130B face a direction perpendicular to a planar surface of the front surface 1155 of the mobile device 1150. The first camera 1130A and the second camera 1130B may be two of the one or more cameras. In some examples, the front surface 1155 of the mobile device 1150 may only have a single camera. In some examples, the mobile device 1150 may include one or more additional cameras in addition to the first camera 1130A and the second camera 1130B. In some examples, the mobile device 1150 may include one or more additional sensors in addition to the first camera 1130A and the second camera 1130B.

FIG. 11B is a perspective diagram 1130 illustrating a rear surface 1165 of a mobile device 1150. The mobile device 1150 includes a third camera 1130C and a fourth camera 1130D on the rear surface 1165 of the mobile device 1150. The third camera 1130C and the fourth camera 1130D of the perspective diagram 1190 are rear-facing. The third camera 1130C and the fourth camera 1130D face a direction perpendicular to a planar surface of the rear surface 1165 of the mobile device 1150. While the rear surface 1165 of the mobile device 1150 does not have a display screen 1145 as illustrated in the perspective diagram 1190, in some examples, the rear surface 1165 of the mobile device 1150 may have a second display screen. If the rear surface 1165 of the mobile device 1150 has a display screen 1145, any positioning of the third camera 1130C and the fourth camera 1130D relative to the display screen 1145 may be used as discussed with respect to the first camera 1130A and the second camera 1130B at the front surface 1155 of the mobile device 1150. The third camera 1130C and the fourth camera 1130D may be two of the one or more cameras. In some examples, the rear surface 1165 of the mobile device 1150 may only have a single camera. In some examples, the mobile device 1150 may include one or more additional cameras in addition to the first camera 1130A, the second camera 1130B, the third camera 1130C, and the fourth camera 1130D. In some examples, the mobile device 1150 may include one or more additional sensors in addition to the first camera 1130A, the second camera 1130B, the third camera 1130C, and the fourth camera 1130D.

Like the HMD 1010, the mobile device 1150 includes no wheels, propellers, or other conveyance of its own. Instead, the mobile device 1150 relies on the movements of a user holding or wearing the mobile device 1150 to move the mobile device 1150 about the environment. In some cases, for instance where the mobile device 1150 is used for AR, VR, MR, or XR, the environment may be entirely or partially virtual. In some cases, the mobile device 1150 may be slotted into a head-mounted device (HMD) (e.g., into a cradle of the HMD) so that the mobile device 1150 functions as a display of the HMD, with the display screen 1145 of the mobile device 1150 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1150.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some examples, computing system 1200 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example computing system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, camera, accelerometers, gyroscopes, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some examples, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. A method for image processing, comprising: obtaining pose information for an image sensor, the pose information indicating a set of viewpoints of an environment, wherein the image sensor is configured to capture frames for reconstructing an object; fitting a curve to the set of viewpoints; determining one or more characteristics of a curve; determining a direction of the image sensor based on the one or more characteristics of the curve and the set of viewpoints; determining an overlap ratio based on the one or more characteristics of the curve and the determined direction of the image sensor; and outputting the determined overlap ratio for selecting frames to be used for reconstructing the object.

Aspect 2. The method of Aspect 1, wherein determining one or more characteristics of the curve comprises determining a center of the curve and a radius of the curve, wherein the direction of the image sensor is determined based on the determined center of the curve, and wherein the overlap ratio is determined based on the radius of the curve.

Aspect 3. The method of Aspect 2, further comprising: obtaining additional pose information for the image sensor; determining that a distance from the center of the curve to a viewpoint indicated by the additional pose information has deviated from the radius of the curve more than a threshold amount; and refitting another curve based on the viewpoint.

Aspect 4. The method of any one of Aspects 2 or 3, wherein viewpoints of the set of viewpoints include location information and direction information for the image sensor.

Aspect 5. The method of Aspect 4, wherein fitting the curve comprises: determining a path for the set of viewpoints based on the location information; and applying a curve fitting algorithm to the path.

Aspect 6. The method of any one of Aspects 4 or 5, wherein determining the direction of the image sensor comprises: determining a vector between a location of a viewpoint about the curve and the center of the curve; and comparing the vector to the direction associated with the viewpoint.

Aspect 7. The method of any one of Aspects 2-6, wherein determining the overlap ratio comprises: determining the radius of the curve is within a range of radii; and determining the direction of the image sensor is pointed in an expected direction.

Aspect 8. The method of any of Aspects 1-7, wherein the pose information comprises 6-Degrees Of Freedom information.

Aspect 9. The method of any of Aspects 1-8, wherein the overlap ratio is determined based on a set of size categories.

Aspect 10. The method of Aspect 9, wherein the overlap ratio is predetermined for size categories of the set of size categories.

Aspect 11. The method of any of Aspects 1-10, wherein a number of viewpoints, of the set of viewpoints, is predetermined.

Aspect 12. An apparatus for processing sensor data, comprising: at least one memory; and at least one processor coupled to the at least one memory and configured to: obtain pose information for an image sensor, the pose information indicating a set of viewpoints of an environment, wherein the image sensor is configured to capture frames for reconstructing an object; fit a curve to the set of viewpoints; determine one or more characteristics of a curve; determine a direction of the image sensor based on the one or more characteristics of the curve and the set of viewpoints; determine an overlap ratio based on the one or more characteristics of the curve and the determined direction of the image sensor; and output the determined overlap ratio for selecting frames to be used for reconstructing the object.

Aspect 13. The apparatus of Aspect 12, wherein, to determine the one or more characteristics of the curve, the at least one processor is configured to determine a center of the curve and a radius of the curve, wherein the direction of the image sensor is determined based on the determined center of the curve, and wherein the overlap ratio is determined based on the radius of the curve.

Aspect 14. The apparatus of Aspect 13, wherein the at least one processor is further configured to: obtain additional pose information for the image sensor; determine that a distance from the center of the curve to a viewpoint indicated by the additional pose information has deviated from the radius of the curve more than a threshold amount; and refit another curve based on the viewpoint.

Aspect 15. The apparatus of any one of Aspects 13 or 14, wherein viewpoints of the set of viewpoints include location information and direction information for the image sensor.

Aspect 16. The apparatus of Aspect 15, wherein, to fit the curve, the at least one processor is configured to: determine a path for the set of viewpoints based on the location information; and apply a curve fitting algorithm to the path.

Aspect 17. The apparatus of any one of Aspects 15 or 16, wherein, to determine the direction of the image sensor, the at least one processor is configured to: determine a vector between a location of a viewpoint about the curve and the center of the curve; and compare the vector to the direction associated with the viewpoint.

Aspect 18. The apparatus of any one of Aspects 13-17, wherein, to determine the overlap ratio, the at least one processor is configured to: determine the radius of the curve is within a range of radii; and determine the direction of the image sensor is pointed in an expected direction.

Aspect 19. The apparatus of any of Aspects 12-18, wherein the pose information comprises 6-Degrees Of Freedom information.

Aspect 20. The apparatus of any of Aspects 12-19, wherein the overlap ratio is determined based on a set of size categories.

Aspect 21. The apparatus of Aspect 20, wherein the overlap ratio is predetermined for size categories of the set of size categories.

Aspect 22. The apparatus of any of Aspects 12-21, wherein a number of viewpoints, of the set of viewpoints, is predetermined.

Aspect 23. A non-transitory computer-readable medium having stored thereon instructions that, when executed by at least one processor, cause the at least one processor to: obtain pose information for an image sensor, the pose information indicating a set of viewpoints of an environment, wherein the image sensor is configured to capture frames for reconstructing an object; fit a curve to the set of viewpoints; determine one or more characteristics of a curve; determine a direction of the image sensor based on the one or more characteristics of the curve and the set of viewpoints; determine an overlap ratio based on the one or more characteristics of the curve and the determined direction of the image sensor; and output the determined overlap ratio for selecting frames to be used for reconstructing the object.

Aspect 24. The non-transitory computer-readable medium of Aspect 23, wherein, to determine the one or more characteristics of the curve, the instructions cause the at least one processor to determine a center of the curve and a radius of the curve, wherein the direction of the image sensor is determined based on the determined center of the curve, and wherein the overlap ratio is determined based on the radius of the curve.

Aspect 25. The non-transitory computer-readable medium of Aspect 24, wherein the at least one processor is further configured to: obtain additional pose information for the image sensor; determine that a distance from the center of the curve to a viewpoint indicated by the additional pose information has deviated from the radius of the curve more than a threshold amount; and refit another curve based on the viewpoint.

Aspect 26. The non-transitory computer-readable medium of any one of Aspects 24 or 25, wherein viewpoints of the set of viewpoints include location information and direction information for the image sensor.

Aspect 27. The non-transitory computer-readable medium of Aspect 26, wherein, to fit the curve, the instructions cause the at least one processor to: determine a path for the set of viewpoints based on the location information; and apply a curve fitting algorithm to the path.

Aspect 28. The non-transitory computer-readable medium of any one of Aspects 26 or 27, wherein, to determine the direction of the image sensor, the instructions cause the at least one processor to: determine a vector between a location of a viewpoint about the curve and the center of the curve; and compare the vector to the direction associated with the viewpoint.

Aspect 29. The non-transitory computer-readable medium of any one of Aspects 24-28, wherein, to determine the overlap ratio, the instructions cause the at least one processor to: determine the radius of the curve is within a range of radii; and determine the direction of the image sensor is pointed in an expected direction.

Aspect 30. The non-transitory computer-readable medium of any of Aspects 23-29, wherein the pose information comprises 6-Degrees Of Freedom information.

Aspect 31. The non-transitory computer-readable medium of any of Aspects 23-30, wherein the overlap ratio is determined based on a set of size categories.

Aspect 32. The non-transitory computer-readable medium of Aspect 31, wherein the overlap ratio is predetermined for size categories of the set of size categories.

Aspect 33. The non-transitory computer-readable medium of any of Aspects 23-32, wherein a number of viewpoints, of the set of viewpoints, is predetermined.

Aspect 34: An apparatus for image generation, comprising means for performing one or more of operations according to any of Aspects 1 to 11.

What is claimed is:

1. A method for image processing, comprising:
obtaining pose information for an image sensor, the pose information indicating a set of viewpoints of an environment, wherein the image sensor is configured to capture frames for reconstructing an object;
fitting a curve to the set of viewpoints;
determining one or more characteristics of the curve, wherein determining one or more characteristics of the curve comprises determining a center of the curve and a radius of the curve;
determining a direction of the image sensor based on the one or more characteristics of the curve including the determined center of the curve, and the set of viewpoints;
determining an overlap ratio based on the one or more characteristics of the curve including the radius of the curve and the determined direction of the image sensor; and
outputting the determined overlap ratio for selecting frames to be used for reconstructing the object.

2. The method of claim 1, further comprising:
obtaining additional pose information for the image sensor;

determining that a distance from the center of the curve to a viewpoint indicated by the additional pose information has deviated from the radius of the curve more than a threshold amount; and refitting another curve based on the viewpoint.

3. The method of claim 1, wherein viewpoints of the set of viewpoints include location information and direction information for the image sensor.

4. The method of claim 3, wherein fitting the curve comprises:

determining a path for the set of viewpoints based on the location information; and applying a curve fitting algorithm to the path.

5. The method of claim 3, wherein determining the direction of the image sensor comprises:

determining a vector between a location of a viewpoint about the curve and the center of the curve; and comparing the vector to the direction associated with the viewpoint.

6. The method of claim 1, wherein determining the overlap ratio comprises:

determining the radius of the curve is within a range of radii; and determining the direction of the image sensor is pointed in an expected direction.

7. The method of claim 1, wherein the pose information comprises 6-Degrees Of Freedom information.

8. The method of claim 1, wherein the overlap ratio is determined based on a set of size categories.

9. The method of claim 8, wherein the overlap ratio is predetermined for size categories of the set of size categories.

10. The method of claim 1, wherein a number of viewpoints, of the set of viewpoints, is predetermined.

11. An apparatus for processing sensor data, comprising:

at least one memory; and at least one processor coupled to the at least one memory and configured to:

obtain pose information for an image sensor, the pose information indicating a set of viewpoints of an environment, wherein the image sensor is configured to capture frames for reconstructing an object;

fit a curve to the set of viewpoints;

determine one or more characteristics of a curve by determining a center of the curve and a radius of the curve;

determine a direction of the image sensor based on the one or more characteristics of the curve, the determined center of the curve, and the set of viewpoints;

determine an overlap ratio based on the one or more characteristics of the curve, the radius of the curve, and the determined direction of the image sensor; and output the determined overlap ratio for selecting frames to be used for reconstructing the object.

12. The apparatus of claim 11, wherein the at least one processor is further configured to:

obtain additional pose information for the image sensor;

determine that a distance from the center of the curve to a viewpoint indicated by the additional pose information has deviated from the radius of the curve more than a threshold amount; and refit another curve based on the viewpoint.

13. The apparatus of claim 11, wherein viewpoints of the set of viewpoints include location information and direction information for the image sensor.

14. The apparatus of claim 13, wherein, to fit the curve, the at least one processor is configured to:

determine a path for the set of viewpoints based on the location information; and apply a curve fitting algorithm to the path.

15. The apparatus of claim 13, wherein, to determine the direction of the image sensor, the at least one processor is configured to:

determine a vector between a location of a viewpoint about the curve and the center of the curve; and compare the vector to the direction associated with the viewpoint.

16. The apparatus of claim 11, wherein, to determine the overlap ratio, the at least one processor is configured to:

determine the radius of the curve is within a range of radii; and determine the direction of the image sensor is pointed in an expected direction.

17. The apparatus of claim 11, wherein the pose information comprises 6-Degrees Of Freedom information.

18. The apparatus of claim 11, wherein the overlap ratio is determined based on a set of size categories.

19. The apparatus of claim 18, wherein the overlap ratio is predetermined for size categories of the set of size categories.

20. The apparatus of claim 11, wherein a number of viewpoints, of the set of viewpoints, is predetermined.

21. A non-transitory computer-readable medium having stored thereon instructions that, when executed by at least one processor, cause the at least one processor to:

obtain pose information for an image sensor, the pose information indicating a set of viewpoints of an environment, wherein the image sensor is configured to capture frames for reconstructing an object;

fit a curve to the set of viewpoints;

determine one or more characteristics of a curve;

determine a direction of the image sensor based on the one or more characteristics of the curve and the set of viewpoints;

determine an overlap ratio based on the one or more characteristics of the curve and the determined direction of the image sensor; and output the determined overlap ratio for selecting frames to be used for reconstructing the object, wherein to determine the one or more characteristics of the curve, the instructions cause the at least one processor to determine a center of the curve and a radius of the curve, wherein the direction of the image sensor is determined based on the determined center of the curve, and wherein the overlap ratio is determined based on the radius of the curve.

22. The non-transitory computer-readable medium of claim 21, wherein the at least one processor is further configured to:

obtain additional pose information for the image sensor;

determine that a distance from the center of the curve to a viewpoint indicated by the additional pose information has deviated from the radius of the curve more than a threshold amount; and refit another curve based on the viewpoint.

23. The non-transitory computer-readable medium of claim 21, wherein viewpoints of the set of viewpoints include location information and direction information for the image sensor.

24. The non-transitory computer-readable medium of claim 23, wherein, to fit the curve, the instructions cause the at least one processor to:

determine a path for the set of viewpoints based on the location information; and apply a curve fitting algorithm to the path.

25. The non-transitory computer-readable medium of claim 23, wherein, to determine the direction of the image sensor, the instructions cause the at least one processor to:

determine a vector between a location of a viewpoint about the curve and the center of the curve; and compare the vector to the direction associated with the viewpoint.

26. The non-transitory computer-readable medium of claim 21, wherein, to determine the overlap ratio, the instructions cause the at least one processor to:

determine the radius of the curve is within a range of radii; and determine the direction of the image sensor is pointed in an expected direction.

27. The non-transitory computer-readable medium of claim 21, wherein the pose information comprises 6-Degrees Of Freedom information.

\* \* \* \* \*